Jan. 1, 1952   E. C. HAWKINS   2,580,772
DEVICE FOR MAKING PACKING RINGS
Filed May 16, 1950
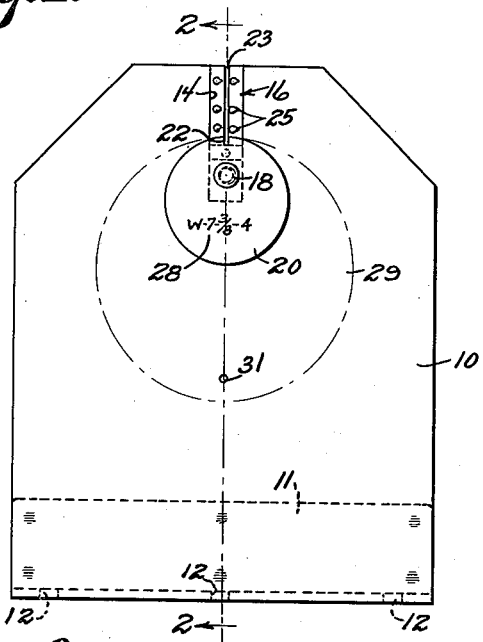
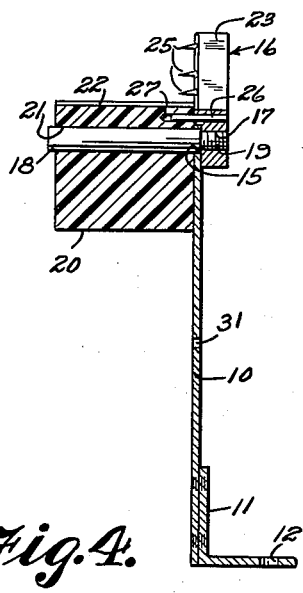
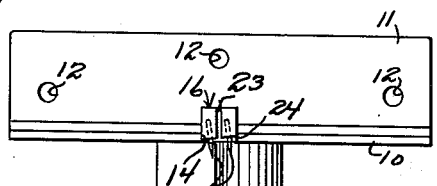
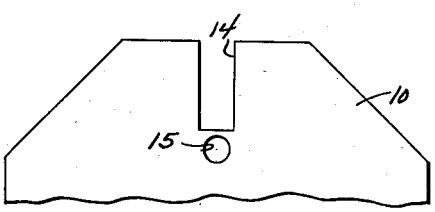
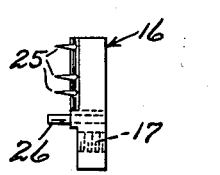
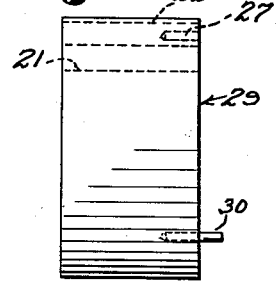
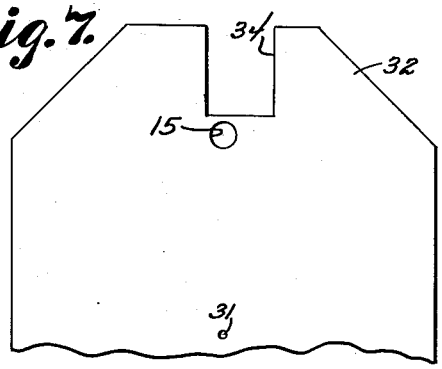
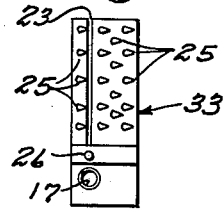
INVENTOR.
Earl C. Hawkins
BY Victor J. Evans & Co.
ATTORNEYS Patented Jan. 1, 1952

2,580,772

UNITED STATES PATENT OFFICE 2,580,772

DEVICE FOR MAKING PACKING RINGS

Earl C. Hawkins, Buffalo, N. Y.

Application May 16, 1950, Serial No. 162,295

2 Claims. (Cl. 164—78)

This invention relates to a device for use in holding packing that is to be cut into predetermined lengths and used in packing pump rods and the like.

The object of the invention is to provide a device which will enable a person to make accurately and with facility packing rings for stuffing boxes of engines, pumps, compressors, the rings being made from coil or spiral packing at a very low cost.

Another object of the invention is to provide a device for use in making packing rings which can be operated by inexperienced personnel without requiring elaborate calculations, so that when the packing is formed into a circle, the ends will meet perfectly.

Another object of the invention is to provide a device for making packing rings which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a front elevational view of the assembled device of the present invention for use in making packing rings;

Figure 2 is a sectional view taken on the line 2—2 of Figure 1;

Figure 3 is a top plan view of the device;

Figure 4 is a fragmentary front elevational view of the top part of the body member;

Figure 5 is a side elevational view of the needle base piece;

Figure 6 is a side elevation view showing a modified or different size mandrel that is adapted to be used in the assembly;

Figure 7 is a fragmentary front elevational view of a modified body member;

Figure 8 is a front elevational view of a modified needle base for use with the body member of Figure 7.

Referring to Figures 1 through 5 of the drawings, the numeral 10 designates a vertically disposed body member which has an L-shaped bracket 11 secured to its lower end, as by welding. The bracket 11 is provided with a plurality of spaced openings 12 therein, whereby suitable securing elements, such as screws, rivets or bolts may be inserted or projected through the openings 12 and into a work bench or table, whereby the body member 10 will be supported in its upright position. The body member 10 is provided with a rectangular cutout 14 adjacent its upper end, Figure 4, for a purpose to be later described, and arranged in the body member 10 below the cutout 14 is a circular opening 15.

Supported by the top of the body member 10 is a needle base piece 16. The base piece 16 is provided with an interiorly threaded socket 17 which registers with the opening 15. A shaft or spoke 18 projects through the opening 15, and the shaft 18 has a threaded end 19 which is arranged in engagement with the threaded socket 17 of the base piece 16. Thus, the base piece 16 will be maintained or connected to the body member 10.

Arranged contiguous to the front surface of the body member 10 is a mandrel or stub 20 which is preferably fabricated of a suitable material, such as impregnated wood, plastic, metal or heat stabilized (hard) rubber, etc. The mandrel 20 is provided with a longitudinally extending bore 21 for the projection therethrough of the shaft 18, the mandrel 20 adapted to be slid on and off the shaft 18 when it is desired to use different sizes of mandrels. The mandrel 20 is also provided with a V-shaped slit 22 which is arranged on its outer surface, and the slit 22 is adapted to receive therein the cutting edge of a knife that is being used for cutting the packing.

The base piece 16 is provided with a vertically disposed slit 23 which registers with the slit 22. The front portion of the base piece 16 is inclined or tapered, as at 24, Figure 3, and the front portion of the base piece 16 projects through the cutout 14 in the body member 10. A plurality of spaced, pointed needles 25 are seated or embedded in the base piece 16, and the needles 25 are adapted to engage or impale the packing that is wrapped around the mandrel 20, so that when a suitable cutting knife is moved down through the slit 23, the packing will be cut to the desired or proper size for forming the packing ring.

Projecting forwardly from the base piece 16 is a dowel pin 26, and the dowel pin 26 projects into an aperture 27 which is arranged in the mandrel 20. The dowel pin 26 serves to maintain or prevent accidental rotation of the mandrel 20 when the parts are in their assembled position. Also, a suitable number or indicia 28 may be etched or arranged on an end of the mandrel 20, and this numbering 28, Figure 1, serves to indicate to the operator the size of the packing to be used and the number of rings to be made for a stuffing box or other member.

In Figure 6, there is shown a different size or modified mandrel which is indicated by the numeral 29, and the mandrel 29 has substantially the same construction as the mandrel 20 except that it has a larger diameter. Also, the mandrel 29 has a guide pin 30 projecting therefrom for insertion in an opening 31 which is arranged in the body member 10. The guide pin 30 thus helps to stabilize the larger sizes of mandrels.

Referring to Figures 7 and 8, there is shown a slightly modified body member 32 and needle base piece 33. In the body member 32 there is provided a cutout 34 which is slightly larger than the cutout 14, but both of these cutouts serve the same purpose. The cutout 34 merely serves to receive therein the wider projecting portion of the base piece 33. Also, the base piece 33 is provided with a larger or greater number of needles 25 than the base piece 16. These additional needles serve to meet the increased resistance to flexure inherent in packings of large size in the more tightly braided types, in packings braided from stiff fibers, such as flax and hemp, in the semi-metallic type impregnated with bits of soft metals, such as babbitt and copper, and in the packing made of alternate layers of canvas and rubber, all of which require a greater pull to bring to a fit around the mandrel than do the softer types.

In use, the device is assembled so that the parts are in the positions shown in Figures 1, 2 and 3. Suitable securing elements can be projected through the openings 12 of the brackets 11, whereby the body member 10 can be supported in an upright position from a work table or bench. The mandrel 20 is arranged or supported on the shaft 18 and a strip of packing to be cut is wrapped around the mandrel 20. One end of the packing to be cut is impaled on certain of the needles 25, and then the packing is wrapped around the mandrel 20 and the other end of the strip of packing is also impaled on the needles 25. Next, a suitable cutting knife is forced or moved downwardly through the slit 23, whereby a packing ring will be formed or cut from the strip of packing. The slit 22 in the plastic mandrel 20 serves to receive the cutting edge of the knife so that damage or dulling of the knife is prevented, as well as insuring a full, clean cut. The indicia or markings 28 on the mandrel 20 identifies the machine, the particular stuffing box to which it is companion, as well as the size and number of rings to be formed. In the event that a smaller or larger packing ring is to be formed, then the operator need only mount a different size mandrel on the shaft 18. Thus, a mandrel, such as the mandrel 29 shown in Figure 6, may be used in lieu of the mandrel 20. The size of any piston, pump or compressor rod determines the size of its packing rings, so that the forming of a ring around a mandrel duplicating the circumferential dimension of a rod will insure an accurate fit for that rod.

From the foregoing, it is apparent that a device has been provided whereby the operator can make various sizes of packing rings from coil or spiral packing at a minimum cost. The mandrel that is used is of the exact size, or has the same diameter as the piston rod to be wrapped. The body member 10 may be made of any suitable material, such as soft steel, and if desired, the body member 10 may have its lower end bent at a right angle instead of having the bracket 11 secured thereto. The slit 22 in the mandrel 20 is arranged so that the sharp edge of the cutting knife will be prevented from abutting the metal body member 10. The needles 25 are set at an angle so that the packing will have no tendency to slip off of the points when being pulled to a tight fit around the mandrel. The packing is wrapped snugly around the mandrel and the packing is pressed against the body member so that it becomes impaled on the needles 25. Then, downward movement of the cutting knife through the slit 23 will result in an accurately formed packing ring.

The device of the present invention is extremely simple and inexpensive to manufacture, and insures that the operator will make perfect rings without requiring calculations for adjustments, setup and the like. If desired, a suitable cutting knife can be securely chained to the body member 10 so that it will not be accidentally lost. Any number of mandrels 20 can be supplied or provided for the device, since different sizes of mandrels are required for the different sizes of packing rings to be formed.

I claim:

1. In a device for making packing rings, a vertically disposed body member provided with a rectangular cutout adjacent its top, an apertured bracket secured to the bottom of said body member for supporting the latter, there being an opening in said body member below said cutout, a base piece having an inclined front portion projecting through said cutout, there being a slit arranged in said base piece, a plurality of pointed needles projecting forwardly from said base piece, there being a threaded socket arranged in said base piece in alignment with the opening in said body member, a shaft projecting through said opening and into engagement with said socket, a plastic mandrel supported on said shaft, there being a V-shaped slit arranged in said mandrel in registry with the slit in said base piece.

2. In a device for making packing rings, a vertically disposed body member provided with a cutout adjacent its top, and apertured brackets secured to the bottom of said body member for supporting the latter, there being an opening in said body member below said cutout, a base piece having an inclined front portion projecting through said cutout, there being a slit arranged in said base piece, a plurality of pointed needles projecting forwardly from said base piece, there being a threaded socket arranged in said base piece in alignment with the opening in said body member, a shaft projecting through said opening and into engagement with said socket, a mandrel supported on said shaft, there being a slit arranged in said mandrel in registry with the slit in said base piece.

EARL C. HAWKINS.

REFERENCES CITED

The following references are of record in the file of this patent:

UNITED STATES PATENTS

| Number | Name | Date |
|---|---|---|
| 648,687 | Garlock | May 1, 1900 |
| 878,507 | Adams | Feb. 11, 1908 |
| 1,446,404 | Tackaberry | Feb. 20, 1923 |
| 2,105,707 | Stancliff | Jan. 18, 1938 |

FOREIGN PATENTS

| Number | Country | Date |
|---|---|---|
| 407,480 | Great Britain | Mar. 22, 1934 |